June 11, 1963 O. WELLER 3,093,042
PHOTOGRAPHIC CAMERA
Filed Nov. 6, 1961 4 Sheets-Sheet 1

Inventor
OTTO WELLER
By Toulmin & Toulmin
Attorneys

June 11, 1963  O. WELLER  3,093,042
PHOTOGRAPHIC CAMERA
Filed Nov. 6, 1961  4 Sheets-Sheet 2

Inventor
OTTO WELLER
By Toulmin & Toulmin
Attorneys

Inventor
OTTO WELLER
By Toulmin & Toulmin
Attorneys

June 11, 1963  O. WELLER  3,093,042
PHOTOGRAPHIC CAMERA
Filed Nov. 6, 1961  4 Sheets—Sheet 4

Inventor
OTTO WELLER
By Toulmin & Toulmin
Attorneys 3,093,042
PHOTOGRAPHIC CAMERA
Otto Weller, Asslar, Kreis Wetzlar, Germany, assignor to Ernst Leitz Gesellschaft mit beschrankter Haftung, Wetzlar (Lahn), Germany
Filed Nov. 6, 1961, Ser. No. 150,266
Claims priority, application Germany Nov. 8, 1960
15 Claims. (Cl. 95—10)

The present invention relates to a photographic camera coupled to a built-in exposure meter, more particularly, to such a photographic camera whereby either the diaphragm opening and exposure time can be adjusted simultaneously according to a predetermined relationship or the exposure time and diaphragm opening can be adjusted independently of each other without the necessity for actuating any mechanism when transferring from either the combined to the independent adjustment or vice versa.

Photographic cameras have been constructed wherein the time exposure and diaphragm opening values were automatically set according to a predetermined relationship or program upon the actuation of an adjustor member. This program or relationship comprised a number of combinations of diaphragm openings and time exposure corresponding to a plurality of light conditions. With this arrangement it was possible for the user of the camera to rapidly adjust the diaphragm and exposure time without any deliberation. These combinations of diaphragm opening and time exposure were generally calculated to combine the smallest possible exposure time and smallest possible diaphragm opening for a given light or illumination value as measured by an exposure meter.

This camera construction limits the user solely to the predetermined combinations of objective opening and exposure time and does not permit the user any freedom for selecting an exposure time or objective opening when special or unusual conditions are encountered wherein a particularly small exposure time or particularly large focal field would be desirable. A camera shutter has been devised wherein all exposure times are controlled by the shutter according to a predetermined program or relationship and wherein a preselection of exposure and diaphragm opening is possible only when the shutter is moved to the B-position.

An improved camera shutter construction provided a free selective adjustment of exposure time and diaphragm opening values over the entire focusing scale. However, in this construction it was necessary to actuate a special switching member when changing from a program control of exposure and diaphragm to a free selection of exposure and diaphragm. Thus, this shutter construction did not provide an absolutely free selection between the program control and free actuation of the adjusting elements of the camera but it was necessary for the user of the camera to actuate an additional switching member.

It is therefore the principal object of this invention to provide a photographic camera wherein the exposure time and diaphragm opening can either be selected according to a predetermined program or can be individually and independently adjusted without the necessity of any special switching member when changing from program control to independent control of the time exposure and diaphragm opening.

In order to achieve the object of the present invention and to overcome the disadvantages of prior art structures, the present invention essentially comprises a camera having a program control adjustor for concurrently adjusting the diaphragm opening and exposure time according to a predetermined relationship. There are two adjusting members for independently adjusting the diaphragm opening and the exposure time. Each adjusting member is provided with an arm extending in parallel to the optical axis of the objective lens.

Two control members are arranged coaxially to the lens mount and are operatively connected to each other by a gear system or, in the alternative, by a fixed length of cable. The two control members each have a stop member thereon between which the arms of the two adjusting members extend.

The program control adjustor is operatively connected to the first control member. Upon actuating the adjustor member the first control member is moved from its initial position to a position corresponding to the prevailing light condition, where it is blocked by means operatively connected to the exposure meter built into the camera.

Upon further actuation of the adjustor member the cable is strained since it has a fixed length. Such further actuation now causes the second control member to continue its rotation, thereby moving the two axially extending arms from the diaphragm opening and exposure time adjusting members to a position against the stop member on the fixed control member. When the adjustor member is released and returns to its initial position, the diaphragm opening and exposure time will remain in their adjusted positions but the control members will return to their initial positions whereby the adjusting means for the diaphragm opening and exposure time can be independently actuated to respectively adjust these quantities.

With this construction the exposure time and diaphragm opening adjusting members are subjected to joint adjustment only by actuation of the adjustor member. In the initial or inoperative position of the program control adjustor member, the adjusting members of exposure time and diaphragm opening can be freely moved over their entire ranges and can be left in their adjusted positions. It is therefore unnecessary for the user of the camera to be concerned with an additional switching or clutching member and the user has a free choice to effect either an automatic adjustment of exposure time and diaphragm opening according to predetermined combinations of these quantities by actuating the adjustor member, or to select any desired combination of exposure time and diaphragm opening by independently actuating the respective adjusting members.

The adjusting members may be arranged either on the objective or camera side of the photographic camera. A preferable construction comprises mounting of the exposure time adjusting means on the objective barrel at the camera side and by positioning the diaphragm opening adjusting means on the objective end of the objective barrel. With this construction only two simply control members extend from the objective barrel into the interior of the camera and accordingly this construction is particularly suitable for use in cameras having exchangeable objectives.

Other objects and advantages of this invention will be apparent upon reference to the accompanying description when taken in conjunction with the following drawings, wherein FIGURE 1 is a top plan view of a camera embodying the present invention with portions thereof shown in section so as to clearly illustrate the relationship of the parts to each other;

Figure 1:
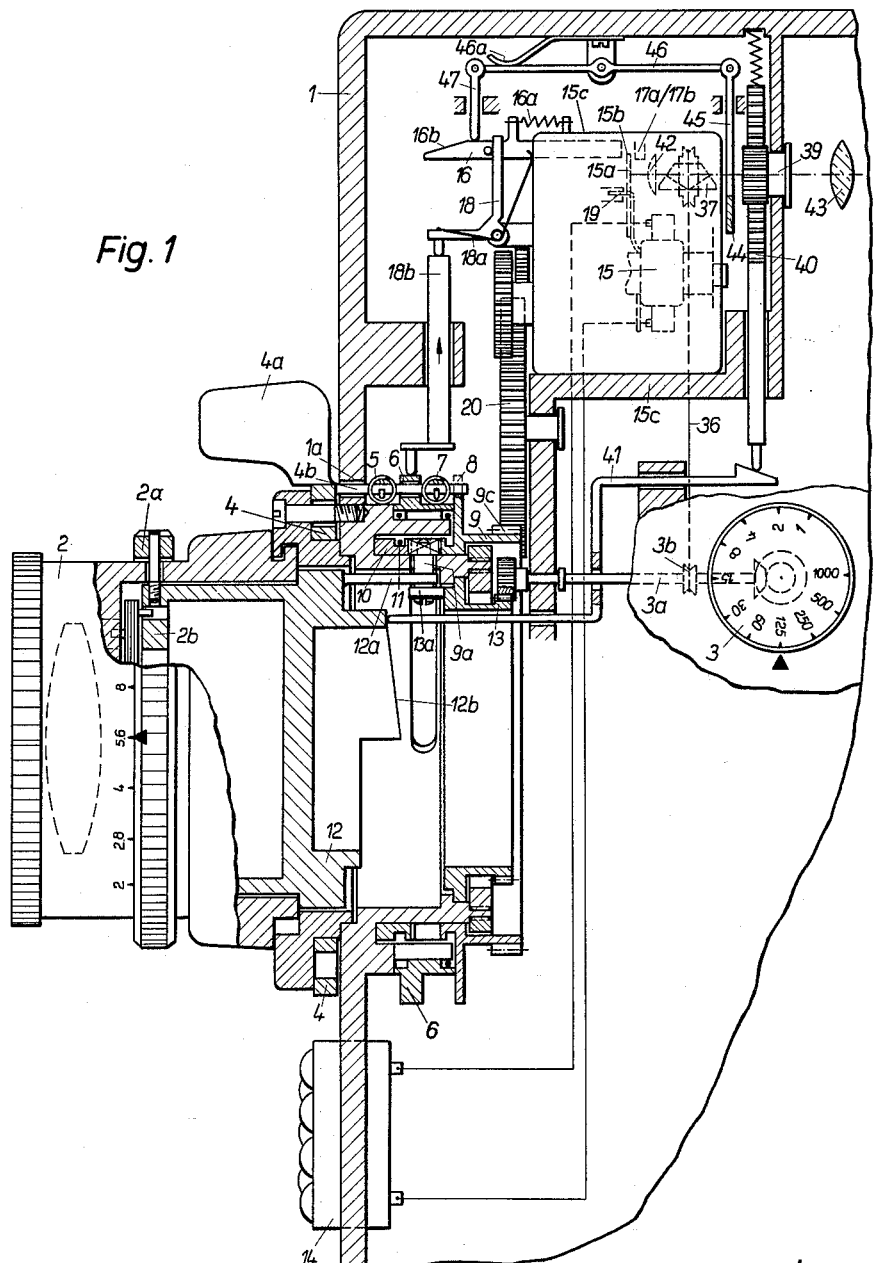

Proceeding next to the drawings wherein like reference symbols indicate the same parts throughout the various views, there is shown in FIGURE 1 a casing 1 of a photographic camera and an objective 2 having an exchangeable mounting. The camera is also provided with an objective diaphragm and a shutter which is known in the art with only the time adjusting knob 3 being shown. The knob 3 is connected by bevel gears to a shaft 3a upon which is mounted a pulley 3b.

Rotatably mounted upon the objective is a diaphragm adjusting ring 2a for actuating the diaphragm. The ring 2a is connected to a rotatable armature ring 2b for adjusting the conventional laminations of the diaphragm. The diaphragm adjusting ring 2a and the time adjusting knob 3 are used in the conventional manner to independently adjust the diaphragm and the time. Knob 3 is geared to a ring 13 which is concentrical to ring 26.

Concentric with the objective there is rotatably mounted a program control adjustor member such as adjustor ring 4 whose rotary movement is limited to a fixed angle by stop means coacting in arcuate slots in the ring. The adjustor ring 4 is biased in its initial or inoperative position by a spring 5 with one end being connected to a fixed portion of the camera and the other end to the ring 4.

The present invention essentially comprises two operating groups of elements:

(1) The program control group.
(2) The exposure meter group including the blocking and scanning structures.

These two groups of elements perform concurrently the following functions in order to adjust the values of the diaphragm opening and exposure time:

(1) Independent adjustment of the time and diaphragm by two adjusting means each of which being operatively connected to a ring, and each ring is provided with an axially extending arm which, in turn, is operatively connected to the program control adjustor.

(2) Actuation of two control members having stop members thereon to position the time and diaphragm adjusting means while the adjustor ring is being operated.

(3) Measuring the intensity of light under which the proposed photograph is to be made and accordingly locking one of the control members in a position in response to this measured light intensity.

Figure 2:
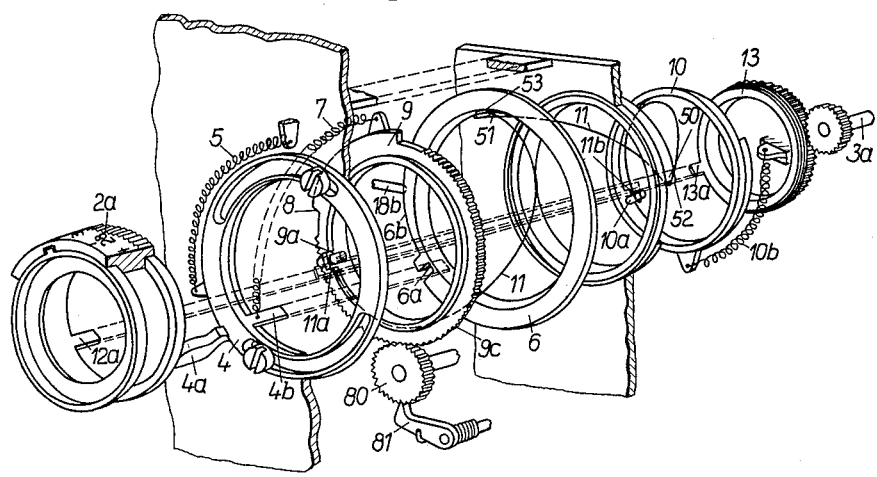
FIGURE 2 is an exploded perspective view of the elements used in the movement of the two control members.
Figure 3:
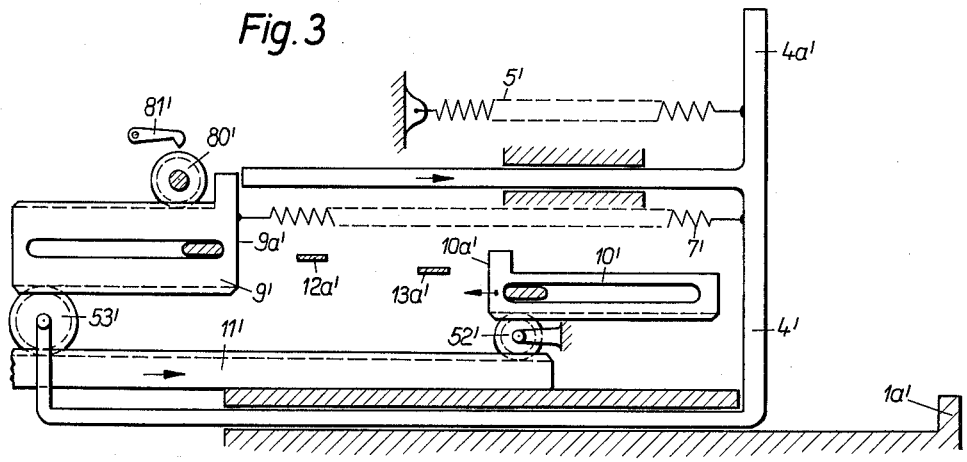
FIGURE 3 is a schematic representation of the operation of the two control members by use of a gear system.

The program control group will next be described with particular reference to FIGURES 1 and 2. The preferred embodiment of the program control group is illustrated in FIGURE 3, but FIGURE 2 is used for describing the invention since this view clearly illustrates the relative position of the several elements. This program control group comprises a flanged cable ring 6 having a radial slot 6a in the flange and a cam surface 6b also in the flange. The slot 6a receives an axially extending arm 4b from the adjustor ring 4. This connection locks the two rings 4 and 6 so that the cable ring will move in conjunction with the adjustor ring.

There is a first control ring 9 which has a radial pin 9a to act as a stop member. The periphery of first control ring 9 has gearing 9c and first control ring 9 is resiliently connected to the adjustor ring 4 by a spring 7. Another abutment or stop member 8 is provided on the outer periphery of first control ring 9.

There is a second control ring 10 which is similarly provided with a radial pin 10a and is resiliently connected to a camera casing by a spring 10b.

A fixed length of cable 11 interconnects the rings 9 and 10 so that these rings will rotate in opposite directions upon rotation of the adjustor ring 4. One end of the cable 11a is fastened to the ring 9 and the other end 11b to the ring 10. Starting from the two points of attachment the ends of the cable are placed around the objective in directions opposite to each other as schematically illustrated in FIGURE 2. The cable 11 has two bends 50 and 51 with the bend 50 passing about an edge 52 which is fixedly mounted on the camera case and the bend 51 sliding around a pulley portion 53 located on the inner surface of the cable ring 6. The cable ring 6 and the casing 1 are provided with suitable recesses in order to accommodate the cable 11 in the manner as illustrated in FIGURE 2.

The casing of the camera is provided with an arcuate slot 1a through which the driving arm 4b extends. The ends of this slot limit the angle through which the ring 4 rotates. The ring 4 is further provided with a push button or operating handle 4a.

The diaphragm armature ring 2b has a cylindrical portion 12 integral therewith which cylindrical portion is provided with an axially extending arm 12a and a cam surface 12b. Ring 13 is provided with a gear meshing a pinion on a shaft 3a gearingly connected to the adjusting knob 3. Ring gear 13 is also provided with an axially extending arm 13a.

The second operating group consists of an exposure meter whose measuring mechanism acts in conjunction with a scanning device for the measuring mechanism pointer and with a locking device which functions to lock the first control ring 9 in a position which is indicative of the intensity of illumination measured by the exposure meter.

In the camera casing on the objective side thereof there is mounted a photoelectric cell 14 which is electrically connected to a stationary measuring mechanism 15 mounted in casing 15c which is formed within camera casing 1. The measuring mechanism 15 is provided with a pointer 15a with the top of the pointer being provided with a flat arcuate portion with one face 15b thereof moving between a longitudinally movable clamping lever 16 and a stationary abutment 17a, 17b. A spring 16a urges the clamping lever 16 in a direction towards the pointer 15a. The clamping lever is positioned away from the pointer 15a by means of a pivotally mounted crank 18 which is urged by a spring 18a in contact with a longitudinally movable intermediate lever 18b. The lever 18b has a pin which is in contact with the cam curve 6b on the cable ring 6, so that rotation of the cable ring 6 will pivot the crank in a clockwise direction as seen in FIGURE 1 to enable the clamping lever 16 to move under the force of the spring 16a and thus clamp the pointer 15a against the abutment 17a, 17b. The cam surface 6b is so chosen that this clamping movement occurs upon the rotation of the adjustor ring 4 through a small angle of movement as compared with its complete range of angular movement.

The pointer 15a has mounted thereon a stop member 19 (see FIGURE 4) which, when in its position as determined by the clamping of the pointer 15a, serves as a tripping member for a scanning device which, in turn, actuates a blocking mechanism soon to be described. Both the scanning device and the blocking device are driven by the gear teeth 9c on the first control ring 9 through an intermediate gear 20. The scanning device and the gear system of the blocking device function to block the movement of the first control ring 9 in a position which corresponds to the light value as measured by the exposure meter. This will fix the pin 9a in a position which is responsive to this light value. The entire scanning and blocking device which is presently to be described is merely indicated schematically in FIGURE 2 by the pinion 80 and the pawl 81.

Figure 4:
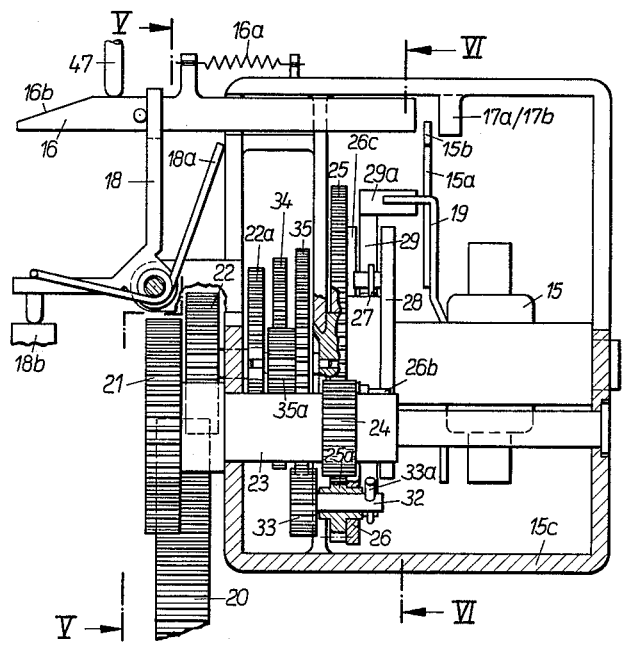
FIGURE 4 is an elevational view of the measuring mechanism of the exposure meter with portions of the camera casing removed to show the elements for positioning the exposure meter pointer in response to the illumination measured thereby.
Figure 5:
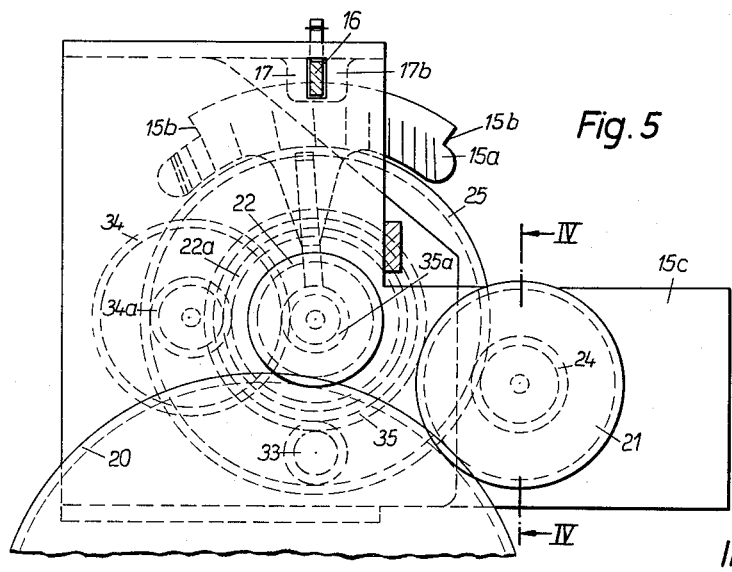

The intermediate gear 20 which is driven by the first control ring 9 at the front face of the casing 15c meshes with two gears 21 and 22 as can be seen in FIGURES 4 and 5. The gear 21 transmits movement to the scanning device and is pivoted on a shaft 23 upon which is fixedly mounted another gear 24 which meshes with a large gear 25. The large gear 25 is attached to the casing of the measuring mechanism 15c and is concentric to the axis of rotation of the coil of the measuring mechanism.

Figure 6:
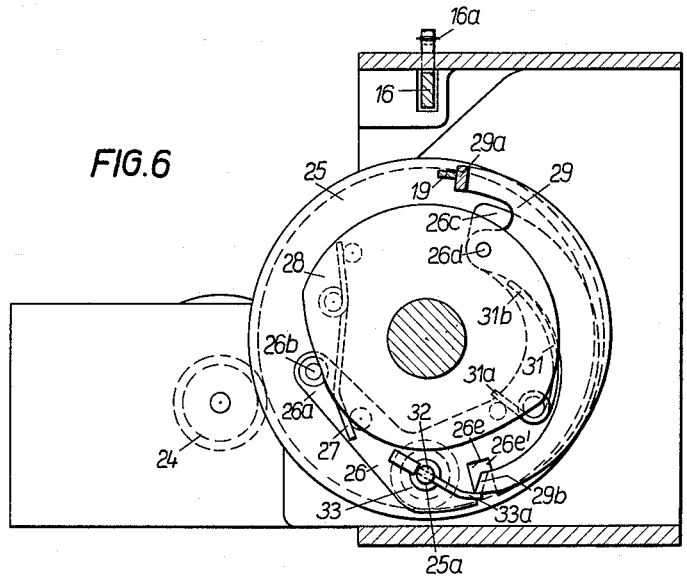
FIGURES 5 and 6 are sectional views taken along the lines V—V and VI—VI, respectively, of FIGURE 4.

A two-armed curved support lever 26 is pivotally mounted on the large gear 25 about a hollow stem 25a (see FIGURE 6). On one end 26a of the lever 26 is a pin 26b which under the action of a spring 27 engages a correction curve 28 which is fixed onto the camera casing. The curve 28 and the lever 26 are only for the purpose of correlating the non-linear deflection of the measuring instrument to the linear scales of the time and diaphragm.

On the other end 26c of the lever 26 there is pivotally mounted at 26d a scanning lever 29. Both of the extreme ends of the scanning lever 29 are bent at right angles so as to form two short stop members 29a and 29b which are perpendicular to the plane of the drawing of FIGURE 6. The stop member 29a scans the position of the stop member 19 on the pointer 15a while the stop member 29b extends into a rectangular slot 26e of the lever 26. Depending on the position of the scanning lever 29, the stop member 29b will either be adjacent the edge 26e' of the slot 26e or will extend into the range of a rotating blocking arm which will be presently described and which can be seen in FIGURE 6.

A spring 31 is positioned between the support lever 26 and the scanning lever 29 with one end thereof 31a engaging the support lever 26 and its other end 31b contacting the scanning lever 29. Under the action of this spring the stop member 29b in its normal inoperative position is positioned adjacent the edge 26e' and will move into the range of a blocking arm only when the other stop member 29a engages the stop member 19 of the exposure meter pointer.

A short shaft or bolt 32 is rotatably mounted in the hollow stem 25a upon which the support lever 26 is pivotally mounted. A blocking arm 33a is fixedly mounted on the shaft 32 perpendicular to the longitudinal axis thereof. On the other end of the shaft 32 there is mounted a pinion gear 33 which meshes with a gear 35 to which is fixedly mounted another pinion gear 35a.

The gear 22 is rotatably mounted and coaxial to the measuring mechanism and has a second pinion gear 22a fixedly attached thereto. The gear 22a meshes with a pinion 34a (see FIGURE 5) which is fixedly connected to a gear 34 which is in mesh with the rotatable pinion 35a.

The purpose of this gearing is to reduce the power which is mechanically transmitted between the adjustor ring 4 and the pinion 33 so that a relatively fast rotation of the pinion 33 and the blocking arm 33a is obtained. In addition, this number of gears is necessary to provide sufficient backlash whereby in the reverse direction of movement of the adjustor ring 4 back to its initial position, the scanning lever 29 will quickly move to pivot the stop member 29b out of the range of movement of the blocking lever 33a. This is to ensure that there will be no blocking of the blocking lever when the adjustor member returns to its initial position.

Figure 7B:
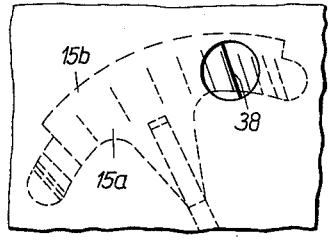
FIGURE 7b is an elevational view of the pointer of the measuring mechanism showing the scale markings thereon in the manner in which these markings are aligned with a hair line in a rotatably mounted graticule.
Figure 7A:
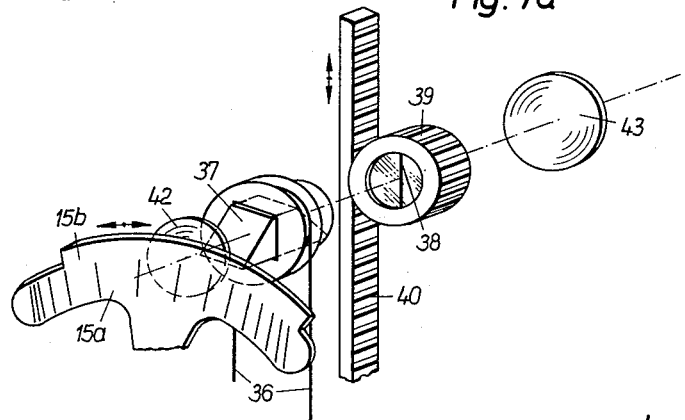
FIGURE 7a is a perspective view of the construction employed for indicating the value of the illumination in a camera viewing window.

This camera is additionally provided with structure for visibly indicating in the view finder that the exposure time and the diaphragm opening have been set either automatically or manually to values corresponding to the prevailing light condition. This structure is in its main parts already described in U.S. Patent 2,197,939 and comprises the pointer 15a as well as a Dove prism 37 (see FIGURES 1, 7a and 7b) which is rotatable about its optical axis in response to the rotation of the time adjusting knob 3 by means of a cord 36 connected to the pulley 3b. There is a graticule hair line 38 mounted in a gear 39 which is rotatable by means of a rack gear 40, a Z-shaped lever 41 and the cam 12b on the diaphragm adjusting ring 12. There are additionally provided two lens systems 42 and 43.

In order to indicate inadequate light conditions wherein either a high or a low light value is measured, an optical indicator signal 44 is provided which operates in response to the clamping movement of the measuring mechanism. This indicator 44 is operatively connected with the clamping lever 16 through a rod 45 which is pivotally connected to one end of a pivotally mounted lever 46. A rod 47 is pivotally connected to the other end of the lever 46 and is engageable with a cam surface 16b on the clamping lever 16. A spring 46a is provided to urge the lever 47 into engagement with the clamping lever 16.

When inadequate light conditions are indicated by the exposure meter, the pointer 15a will rotate so far that the clamping lever 16 will descend between the abutment portions 17a and 17b. Accordingly, the lever 47 will follow the descending cam surface 16b and accordingly will pull the signal indicator 44 into the field of view of the optical elements 42 and 43.

The above-described operating groups function together in the following manner:

When the program control button 4a is pushed downwardly, the adjustor ring 4 and its driving arm 4b will be rotated against the power of the return spring 5. The driving arm 4b will also rotate the cable ring 6 and, through the medium of the spring 7, first control ring 9. The rotation of first control ring 9 initiates in the measuring instrument 15 of the exposure meter construction three different but simultaneous operations:

I. As seen in FIGURE 1, the intermediate lever 18b will move in the direction of the arrow thereon under the action of the cam surface 6b. This will rotate the crank 18 clockwise against the force of the spring 18a and the clamping lever 16 will be released. Under the action of the spring 16a the clamping lever 16 will engage the face 15b of the pointer 15a and will clamp the pointer between the end of the clamping lever and the abutments 17a, 17b. As a result, the stop member 19 which is mounted on the pointer 15a is arrested in a position which corresponds to the light conditions as measured by the exposure meter.

II. The large gear 25 will be rotated by the rotation of the first control ring 9 with which it is in mesh. The support lever 26 and the scanning lever 29 rotate with the gear 25 upon which they are mounted. The stop member 29b will be in position against the edge 26e' of the slot 26e. When, during the rotation of the large gear 25, the stop member 29a engages the stop member 19, then the scanning lever 29 will pivot about its mounting 26d against the force of spring 31. At that moment, when the stop member 29a abuts the stop member 19, the stop member 29a is relatively unaffected by the force of the spring 7 so that the stop member 29a is positioned at the stop member 19 with a much smaller force of the spring 31. The tilting of the scanning lever 29 around its axis 26b will position the stop member 29b in the range of the blocking arm 33a, thus arresting further rotation of the pinion 33. The blocking arm 33a and the scanning lever 29 with its stop member 29b are so dimensioned that the tangent line of the circle described by the extreme end of the blocking arm 33a by its rotation passes at the point of impact with the stop member 29b approximately through the pivot axis 26d. As a result, the power of this impact is received in this pivot pin 26d and does not affect the stop member 19 which is connected to the measuring mechanism.

III. Simultaneously with the rotation of the gear 21, gear 22 is also rotated by the intermediate gear 20. The rotation of the gear 22 actuates the gear system comprising the gears 22a, 34a, 34, 35a, and 35. Because of the high gear ratio the pinion 33 and the blocking arm 33a will rotate at a high number of revolutions. When the gear 33 is stopped from rotating by the action of the stop member 29b engaging the blocking arm 33a, a reverse blocking of the gear system through the gear 22 occurs and accordingly a blocking of the first control ring 9 through the intermediate gear 20.

The movements of the adjustor ring 4 caused by a depression of the button 4a are (1) arresting of the pointer of the measuring mechanism;

(2) Scanning the position of this pointer, and in response to this position, locking of the gearing including the first control ring 9 in a position corresponding to the illumination intensity as measured by the exposure meter.

When the first control ring 9 is blocked, the adjustor ring 4 continues to rotate throughout its constant angle as determined by the arcuate slots therein. The continued rotation of the adjustor ring 4 is possible because of the spring connection 7 between the adjustor 4 and the first control ring 9. If the first control ring 9 is blocked while the adjustor ring 4 continues to rotate, the driving arm 4b will move away from the stop member 8. This will produce a tensioning of the spring 7. When the button 4a is released and the adjustor ring 4 returns to its initial position under the action of the spring 5, the spring 7 will be released from tension and the driving arm 4b will abut the stop member 8 to rotate first control ring 9 back into its initial position. It is thus apparent that while the adjustor ring 4 is always moved through the same angle, the first control ring 9 moves only over an angle which is proportional to the intensity of the illumination.

The above-described blocking is released by the rotation of the first control ring 9 in the reverse direction. As a result, the gears 21, 22 and 25 as well as the pinion gear 33 with the blocking arm 33a will be reversely rotated over the gear 20. The gear train comprising the gears 22a, 34a, 34, 35a and 35 which is connected between the gear 22 and the blocking arm 33a, produces a backlash or play which results in a delay of the movement of the blocking arm 33a with respect to the large gear 25. Accordingly, the large gear 25 with the support lever 26 and the scanning lever 29 mounted thereon will first move because of this reverse rotation of the first control ring 9. Scanning lever 29 will immediately become disengaged from the stop member 19 and will return to its initial position under the action of the spring 31. Accordingly, the stop member 29b will again be positioned at the edge 26e' and will now be out of the range of the blocking arm 33a. The blocking arm 33a will now begin to rotate and can move freely.

The continued pushing down of the program control button 4a after the first control ring 9 has been locked in position produces a further operation because of the movement of the cable ring 6 which is connected to the adjustor ring 4. Under the action of the cable 11 one end of which is fixed at 11a and is stationary since the first control ring 9 is locked, the second control ring 10 will be rotated in such a direction that its stop pin 10a will collect the arms 12a and 13a against the stop pin 9a. The cable 11 has such a length that the pin 10a will always stop a distance from the pin 9a which is equal to the width of the arms 12a and 13a when they are in the superimposed position. The gathering of the arms 12a and 13a produces the actual adjustment of the time and diaphragm.

When the first control ring 9 is locked in position as described above, further rotation of the adjustor ring 4 will rotate the cable ring 6 and will move the pulley 53 to tighten the cable at the point 51. Since the cable 11 is of a fixed length, the second control ring 10 will be rotated in such a direction that the pin 10a approaches the pin 9a. In FIGURE 2 the axial arms 12a and 13a are shown in their gathered position between the stop pins 9a and 10a. The relative positions of the arms 12a and 13a are shown by dotted lines.

When the program control button 4a is released, the cable ring 6 together with its pulley 53, the first control ring 9 and the second control ring 10 will return to its initial position. The first control ring 9 will be returned by the driving arm 4b while the second control ring 10 will be returned by the action of the spring 10b.

In FIGURE 3 there is schematically illustrated a gear system which is preferably used in place of the cable 11. Corresponding elements are designated with the same reference symbols but have a prime (') added thereto.

The adjustor ring 4', the first control ring 9', the second control ring 10', axial arms 12a' and 13a' and springs 5' and 7' are similar as described in FIGURES 1 and 2 and function in the same manner. In place of the cable 11 there is provided a cylindrical gear 11', the stationary pinion gear 52' in mesh therewith and a movable pinion gear 53' also in mesh with the gear 11'. The pinion 53' replaces the adjustable edge or pulley 53 and is similarly fixedly mounted on the adjustor ring 4'. This gear system differs only from the cable connection in that no special reverse spring is necessary for the second control ring 10' since the ring 10' is positively driven by the pinion 52' when the button 4a' is released to return to its initial position.

If the user of the camera so desires and the program control button 4a is not actuated, the time and diaphragm can be freely adjusted by the adjusting members 2a and 3 in the known manner. This free adjustment of the time and diaphragm can occur without first releasing any coupling or clutching arrangement in the automatic structure actuated by the program control button 4a. It is not even necessary to position the time and diaphragm adjusting means in a certain starting position before actuating the program control button 4a. Thus, there are no limitations on the actuation of adjusting members 2a and 3 or on the program control button 4a.

In order that the program control structure functions properly, it is preferable that a certain relationship be maintained between the displacement of the gear 25 and the displacement of the time and diaphragm adjusting members. By way of example, if the position of the gear 25 changes by one light value (due to the change in angle of the stop member 19) the displacement of the time and diaphragm adjusting means, indirectly the displacement of the axial arms 12a and 13a, should be only half a unit so that as a result the adjusted exposure will change by only one light value. Therefore, between the gear 25 and pin 9a of the first control ring whose position directly determines the adjustment of the time and diaphragm adjusting means, there should be maintained a ratio of 2:1 with respect to the light value units.

While the preferable construction of the present invention has been described above, other alternatives are possible. The two adjusting members for the time and exposure can be both mounted on the objective end in the form of two rings positioned side-by-side and which are concentric with respect to the objective mount. By arranging the time and diaphragm scales of these adjusting members in a particular way, a simultaneous manual turning of the two adjusting members at a light value adjustment would be possible. With this construction it would be possible to use an interchangeable objective structure although as a practical matter the expense of such a structure would be relatively high.

It will be understood that this invention is susceptible to modification in order to adapt it to different usages and conditions and, accordingly, it is desired to comprehend such modifications within this invention as may fall within the scope of the appended claims.

What is claimed as this invention is:

1. A photographic camera having an adjustable diaphragm opening and exposure time, and comprising an exposure meter mounted therein, a rotatable adjusting means for independently adjusting the diaphragm opening and having an arm axially extending therefrom, a second adjusting means for independently adjusting the exposure time, including a ring having an arm axially extending therefrom, a first rotatable control ring having a radial pin thereon, a second rotatable control ring having a radial pin thereon, an adjustor ring for concurrently adjusting the diaphragm opening and exposure time according to a predetermined relationship, means actuated by said adjustor ring for positioning said first control ring in response to the illumination measured by said exposure meter, and means operatively connecting said first control ring and said second control ring so that said pin of said second control ring engages said axial arms and positions said arms against said pin of said first control ring when said adjustor ring is actuated.

2. A photographic camera as claimed in claim 1 and further comprising resilient means urging said adjustor ring, first control ring and second control ring into their initial positions.

3. A photographic camera as claimed in claim 2 wherein said first control ring has a stop member thereon engageable with a portion of said adjustor ring, and a spring connecting said first control ring and said adjustor ring whereby said first control ring can be stopped in a position in response to the illumination measured by said exposure meter while said adjustor ring is still rotatable.

4. A photographic camera as claimed in claim 3 and further comprising a flexible line of a fixed length connecting said first control ring and said second control ring so that said first control ring and said second control ring are rotatable in opposite directions in response to the rotation of said adjustor ring.

5. A photographic camera having an adjustable diaphragm opening and exposure time, and comprising an exposure meter having a movable pointer for indicating the illumination measured thereby, a rotatable ring for independently adjusting the diaphragm opening and having an arm axially extending therefrom, a second rotatable ring for independently adjusting the exposure time and having an arm axially extending therefrom, a rotatable first control ring having a radial pin thereon, a rotatable second control ring having a radial pin thereon, an adjustor ring for concurrently adjusting the diaphragm opening and exposure time according to a predetermined relationship, means operatively connected to said adjustor ring and actuated thereby to lock said exposure meter pointer in position, blocking means actuated by said locking means for positioning said first control ring in response to the illumination measured by said exposure meter, and means operatively connecting said first control ring and said second control ring so that said second control ring pin engages said axial arms and positions said arms against said first control ring radial pin.

6. A photographic camera as claimed in claim 5 wherein said locking means comprises a gear having a compensating lever pivotally mounted thereon, and a scanning lever pivotally mounted on said compensating lever.

7. A photographic camera as claimed in claim 6 wherein one end of said scanning lever is engageable by a portion of said pointer whereby the other end thereof is pivoted, said blocking means comprising a blocking arm engageable by said pivoted other end of said scanning lever to lock said blocking means in position.

8. A photographic camera as claimed in claim 7 and further comprising a pinion gear rotatably mounted on said gear, gear means operatively connecting said pinion gear with said first control ring so that the rotation of said first control ring actuates said gear means to rotate said pinion, said blocking arm being mounted on said pinion.

9. A photographic camera as claimed in claim 8 wherein said gear means comprises a driving gear coaxial with said gear supporting said pinion gear and meshing with said pinion gear whereby said pinion gear is rotated as a planatory gear about said driving gear and is also rotatable about its own axis by said gear means.

10. A photographic camera as claimed in claim 8 wherein said compensating lever and said pinion gear are mounted on the same axis of rotation.

11. A photographic camera as claimed in claim 5 and further comprising an optical indicator operable by said blocking means to indicate the presence of light conditions which are unsuitable for an exposure.

12. A photographic camera as claimed in claim 1 wherein said exposure meter has a movable transparent pointer member with inclined scale markings thereon, a rotatably mounted graticule having a hair line therein and operatively connected to said diaphragm opening adjusting means, and an optical element operatively connected to said time exposure adjusting means and aligned with said graticule so that rotation of said graticule and said optical member will align said hair line with a marking on said pointer member when said diaphragm opening means and time exposure means are adjusted corresponding to the light conditions measured by said light meter.

13. A photographic camera having an adjustable diaphragm opening and exposure time, and comprising an exposure meter mounted therein, means for independently manually and directly adjusting the diaphragm opening, means for independently manually and directly adjusting the exposure time, a first member operatively connected to said diaphragm adjusting means, a second member operatively connected to said exposure time adjusting means, actuating means normally disengaged from said two members and permitting free movement thereof for independent manual diaphragm and time adjustment, and a manually operable adjustment element connected to said actuating means for placing it into engagement with said two members for actuating both said members to adjust said diaphragm and exposure time according to a predetermined relationship in response to the illumination measured by said exposure meter.

14. A photographic camera, having an adjustable diaphragm opening and exposure time and comprising an exposure meter mounted therein, means for manually independently and directly adjusting the diaphragm opening, means for manually, independently and directly adjusting the exposure time, a first arm connected to said diaphragm adjusting means, a second arm operatively connected to said exposure time adjusting means, a first control member, means for positioning said first control member in response to the intensity of illumination measured by said exposure meter, and means including a second control member, normally disengaged from said arms and being manually operable independent from said two adjusting means for placing said two arms into a position as determined by the position of said first control member to respectively adjust said diaphragm adjusting means and said exposure time adjusting means according to a predetermined relationship.

15. A photographic camera having an adjustable diaphragm opening and exposure time, and comprising an exposure meter mounted therein, means for independently manually and directly adjusting the diaphragm opening, means for independently manually and directly adjusting the exposure time, a first member operatively connected to said diaphragm adjusting means, a second member operatively connected to said exposure time adjusting means, means normally disengaged from said members and in an inoperative position, and being movable for actuating both said members to adjust said diaphragm and exposure time according to a predetermined relationship, means positionable in response to the illumination measured by said exposure meter and defining stop means for said actuating means and said members, and means for returning said actuating means from its operative position to its inoperative position thereby releasing said first and second members for independent adjustment of said exposure time and diaphragm.

References Cited in the file of this patent

UNITED STATES PATENTS

| | | |
|---|---|---|
| 2,197,939 | Leitz | Apr. 23, 1940 |
| 2,969,004 | Gebele | Jan. 24, 1961 |
| 2,990,758 | Sauer | July 4, 1961 |
| 2,993,422 | Rentschler | July 25, 1961 |
| 3,013,478 | Gebele | Dec. 19, 1961 |
| 3,016,811 | Bundschuh | Jan. 16, 1962 |